United States Patent
Scheuter et al.

(10) Patent No.: US 6,339,962 B1
(45) Date of Patent: Jan. 22, 2002

(54) FORCE SENSOR

(75) Inventors: Felix Scheuter, Rolligen; Christian Maurer, Bern, both of (CH)

(73) Assignee: Haenni Instruments AG, Jegenstorf (CH)

( * ) Notice: Subject to any disclaimer, the term of this patent is extended or adjusted under 35 U.S.C. 154(b) by 0 days.

(21) Appl. No.: 09/529,127

(22) PCT Filed: Oct. 9, 1998

(86) PCT No.: PCT/CH98/00435

§ 371 Date: May 11, 2000

§ 102(e) Date: May 11, 2000

(87) PCT Pub. No.: WO99/19697

PCT Pub. Date: Apr. 22, 1999

(30) Foreign Application Priority Data

Oct. 9, 1997 (CH) .............................................. 2365/97

(51) Int. Cl.[7] .................................................. G01N 3/00
(52) U.S. Cl. ........................................................ 73/796
(58) Field of Search .......................... 73/768, 772, 774, 73/794, 796, 795, 862.045, 862.381

(56) References Cited

U.S. PATENT DOCUMENTS

| | | |
|---|---|---|
| 2,392,293 A | 1/1946 | Ruge |
| 4,422,889 A | 12/1983 | Trezeguet et al. |
| 4,493,220 A * | 1/1985 | Carignan et al. ......... 73/862.66 |
| 4,598,168 A * | 7/1986 | Wagner et al. ............... 174/115 |
| 5,025,329 A * | 6/1991 | Taniguchi et al. ........ 360/77.16 |
| 5,146,790 A * | 9/1992 | Fish ....................... 73/862.336 |
| 5,714,695 A * | 2/1998 | Bruns ..................... 73/862.641 |
| 5,780,742 A * | 7/1998 | Burns et al. .............. 73/514.29 |

FOREIGN PATENT DOCUMENTS

| | | |
|---|---|---|
| CH | A5667329 | 9/1988 |
| DE | B1274804 | 8/1968 |
| DE | C4140068 | 6/1992 |
| EP | A141731 | 5/1985 |
| EP | A218465 | 4/1987 |

\* cited by examiner

*Primary Examiner*—Max Noori

(57) ABSTRACT

A force sensor has an elastically deformable carrier (10; 110) which absorbs the force to be measured and on which there are a first and a second strain measurement element (21, 31; 121, 131) arranged such that the elastic deformation of the carrier (10; 110) which is caused by the force leads to different elongations in the two strain measurement elements (21, 31; 121, 131). This difference in elongations is used as a measure for the force to be measured. The force sensor as claimed in the invention is largely immune to disruptive ambient influences such as temperature changes, electromagnetic interference, tensile, compressive and/or shearing forces in the lengthwise direction of the tube, shearing forces transversely to the lengthwise direction of the tube, etc. Wheel load scales with several force sensors as claimed in the invention have such a short response time that it enables measurement of the wheel loads of moving vehicles.

25 Claims, 3 Drawing Sheets

FORCE SENSOR

This application is the national phase under 35 U.S.C. § 371 of PCT International Application No. PCT/CH98/00435 which has an International filing date of Oct. 9, 1998, which designated the United States of America.

TECHNICAL DOMAIN

This invention relates to a force sensor and a force measurement means which is provided with the force sensor and which is especially suited for use both in stationary and also in transportable wheel load scales.

1. Prior Art

Force sensors (also called dynamometer cells) which are suitable for measuring a force which acts at a point or a point force exist in a host of different embodiments. But for use especially for wheel load scales however force sensors are desired which measure not a force acting at a point, but the integral of a force which acts on a line or on a surface.

CH 667 329 (Haenni & Cie AG) discloses scales with force sensors in the form of elongated hollow elements which are suited for measuring a force which acts in a line. By arranging several of these force sensors in succession the scales can measure the surface integral of the force acting on a surface according to CH 667 329. To measure the force, the volume of a liquid is measured which is displaced by the force on the elastic hollow elements out of them. The scales according to CH 667 329 are well suited as a wheel load scales, but their production is structurally complex and relatively expensive.

2. Description of the Invention

The object of this invention is to make available a force sensor which is especially suitable for measuring the wheel loads of moving vehicles and which is invulnerable to ambient influences such as temperature changes, electromagnetic interference, etc., and which is simple to produce, and a force measurement means or scales provided with the force sensor.

EP-A2-0 141 731 (SFERNICE SOCIETE FRANCAISE DE L'ELECTRO-RESISTANCE) describes a force sensor with an elastically deformable elongated rod with a series of strain measurement elements on its outside along one or more helical lines. The opposite lengthwise ends of the rod are made for clamping in two elements which can move relative to one another in order to measure the bending, torsion and shear stresses acting between these two elements. The force to be measured and the counterforce are supplied at points on the lengthwise ends of the rod. The force sensor as claimed in EP-A2-0 141 731 is not suited for use for wheel load scales where forces acting in a line or on a surface must be measured.

The force sensor as claimed in the invention has an elastically deformable elongated carrier which absorbs he force to be measured and on which there are a first and a second strain measurement element arranged such that the elastic deformation of the carrier which is caused by the force leads to different elongations in the strain measurement elements. This difference of elongations is used a as measure for the force to be measured.

The approach as claimed in the invention has the advantage that disruptive ambient effects (for example, in the form of temperature changes) which influence the two strain measurement elements in the same way do not significantly impair the measurement result since to measure the force only the difference between the measured values of the two strain measurement elements, but not their absolute values, is used.

Preferably the carrier has an elongated shape and is arranged with one side resting essentially over its entire length on a solid, unyielding base such that the force to be measured acts essentially transversely to the lengthwise direction of the carrier and perpendicular to the base on the carrier so that the carrier is compressed in the direction parallel to the action of the force and is stretched in the direction perpendicular to the action of the force and perpendicular to the lengthwise direction of the carrier. The two strain measurement elements can be arranged on the carrier such that the compression is measured essentially by the first strain measurement element and the extension is measured essentially by the second strain measurement element.

The carrier can have a tube (measurement tube) with an essentially circular cross section; in its cavity as overload protection there is a rod element with an essentially circular cross section of a solid material, the diameter of the rod element being dimensioned such that the inner surface of the measurement tube strikes at least partially the surface of the rod element when the force sensor is overloaded before reaching the elastic limit of the measurement tube, by which irreversible, plastic deformation of the measurement tube is prevented.

In one preferred embodiment of the force sensor as claimed in the invention the first strain measurement element in the form of a first quasi-helical line which is coaxial to the measurement tube and the second strain measurement element in the form of a coaxial second quasi-helical line are arranged to run around the axis of the carrier, the shapes of the quasi-helical lines, that is the shapes projected onto a plane normal to the axis, each having one long diameter and one short diameter and the long and the short diameter of the first quasi-helical line being sloped by an angle relative to the long and short diameter of the second quasi-helical line. Preferably the arrangement is such that the angle of incline between the long diameter of the first quasi-helical line and the long diameter of the second quasi-helical line on the one hand and the angle of incline between the short diameter of the first quasi-helical line and the short diameter of the second quasi-helical line on the other each measure essentially 90°. Advantageously the two quasi-helical lines are arranged in the manner of a two-start thread.

In another embodiment of the force sensor as claimed in the invention the first strain measurement element is located in a first line which meanders along the axis of the measurement tube, the first meander line running essentially on the jacket surface of a first quarter segment of the cylindrical measurement tube. The second strain measurement element is located in a second line which meanders along the axis of the measurement tube, the second meander line running essentially on the jacket surface of a second quarter segment of the cylindrical measurement tube, i.e. the segment adjoining the first quarter segment. The strain measurement elements arranged in a meander shape thus run in surfaces along the tube axis which are essentially perpendicular to one another. The meander lines can run in a zig-zag, sawtooth, sinusoidally, semicircularly, rectangularly or in some other meandering shape. Furthermore, there can be a third strain measurement element in a third meander line essentially on the jacket surface of a third quarter segment which borders the second quarter segment, and a fourth strain measurement element in a fourth meander line essentially on the jacket surface of a fourth quarter segment between the first and the third quarter segment. In this arrangement with four strain measurement elements the first can be serially connected to the third and the second can be serially connected to the fourth.

In one embodiment with a carrier which lies with one side essentially over its entire length on a solid, unyielding base, an alternative embodiment of the invention, the carrier has a top which is provided with first ribs, a bottom which is provided with second ribs and which is essentially parallel to the top, a left side and a right side. The second ribs are arranged essentially parallel to the first ribs and are offset to them. The first strain measurement element is located on the right side of the carrier and runs in a zig-zag between the top and the bottom back and forth, its running from the first rib on the top to the next rib on the bottom, from the latter to the next rib on the top, from it to the next rib on the bottom, etc. The second strain measurement element is located on the left side of the carrier and runs in a zig-zag between the top and the bottom back and forth, its running from the first middle between the two ribs on the top to the next middle between the two ribs on the bottom, from it to the next middle between the two ribs on the top, etc. For a force acting essentially perpendicular to the top on the first ribs the carrier which lies essentially with the second ribs on an unyielding base is deformed in an undulatory manner, the first strain measurement element being compressed and the second strain measurement element being stretched. In contrast to the carrier which lies with one side essentially over its entire length on a base the carrier which lies simply with ribs on the base is deformed not simply it is transverse direction, but also in its lengthwise direction.

In another preferred embodiment of the force sensor the strain measurement elements are arranged in grooves which are made in the surface of the carrier. The strain measurement elements can be sealed with an electrically insulating material in the grooves. If the strain measurement elements consist of an ordinary resistance wire, the sealing of the latter in a groove has the advantage that not only tensile stress but also compressive stress can be measured by means of the resistance wire. The sealing material causes compressive forces to be transferred to the resistance wire. In contrast, by means of an exposed resistance wire compressive stress cannot be measured since the wire deflects as a result of the compressive forces. If nevertheless not only elongations but also compressions of the groove are to be measured with a resistance wire which is located exposed in a groove, the resistance wire must be prestressed such that it is always exposed to a tensile stress when the groove is being compressed.

Preferably the strain measurement elements have an electrical conductor which has electrical resistance which is dependent on the elongation. The electrical conductor can be for example an ordinary electrical resistance wire, constantan being preferred as the material for the resistance wire. To measure the electrical resistance ratio from the first to the second electrical conductor as a measure of the force to be measured, the force sensor as claimed in the invention preferably has a Wheatstone bridge circuit. This embodiment of the force sensor as claimed in the invention has an extremely short reaction time; this is especially advantageous when wheel loads of moving vehicles are being measured.

In another preferred embodiment of the invention the carrier and the strain measurement elements are located in a hermetically sealable overtube which consists preferably of an electrically conductive material. The force sensor as in this embodiment of the invention is protected especially well against external effects such as temperature changes, vibrations, electromagnetic interference, moisture, dirt, etc.

The force measurement means as claimed in the invention has one or more force sensors as claimed in the invention.

Preferably the force measurement means has at least two force sensors with one first and one second strain measurement element each, which each have one electrical conductor with an electrical resistance which is dependent on the elongation, and a single Wheatstone bridge circuit, for determination of the total force which acts on the force sensors by means of the Wheatstone bridge circuit the electrical conductors of the first strain measurement elements being located in a first series connection and the electrical conductors of the second strain measurement elements being located in a second series connection.

In one preferred embodiment of the invention, wheel load scales have the force measurement means as claimed in the invention, one or more of the elastically deformable carrier being located essentially in a straight line and lengthwise to the direction of travel of the wheels to be weighed. The wheel load scales as in this embodiment of the invention can have a coupling device for coupling to other connectable wheel load scales. In this way several of these wheel load scales can be coupled to one another in order to cover the entire width of the roadway without adulteration of the measurement result and/or dead areas forming at the coupling sites.

The description of this invention which is detailed below in conjunction with the attached drawings is used as only one example for better understanding of the invention and should not be interpreted as a limitation of the protected scope of the claims. For one skilled in the art other advantageous embodiments and combinations of features which however still lie within the scope of this invention can be easily seen from the following description in conjunction with the attached drawings and the totality of patent claims.

BRIEF DESCRIPTION OF THE DRAWINGS

The drawings represent one preferred embodiment of this invention.

Basically the same parts are labelled with the same reference numbers in the figures.

EMBODIMENTS OF THE INVENTION

Figure 1:
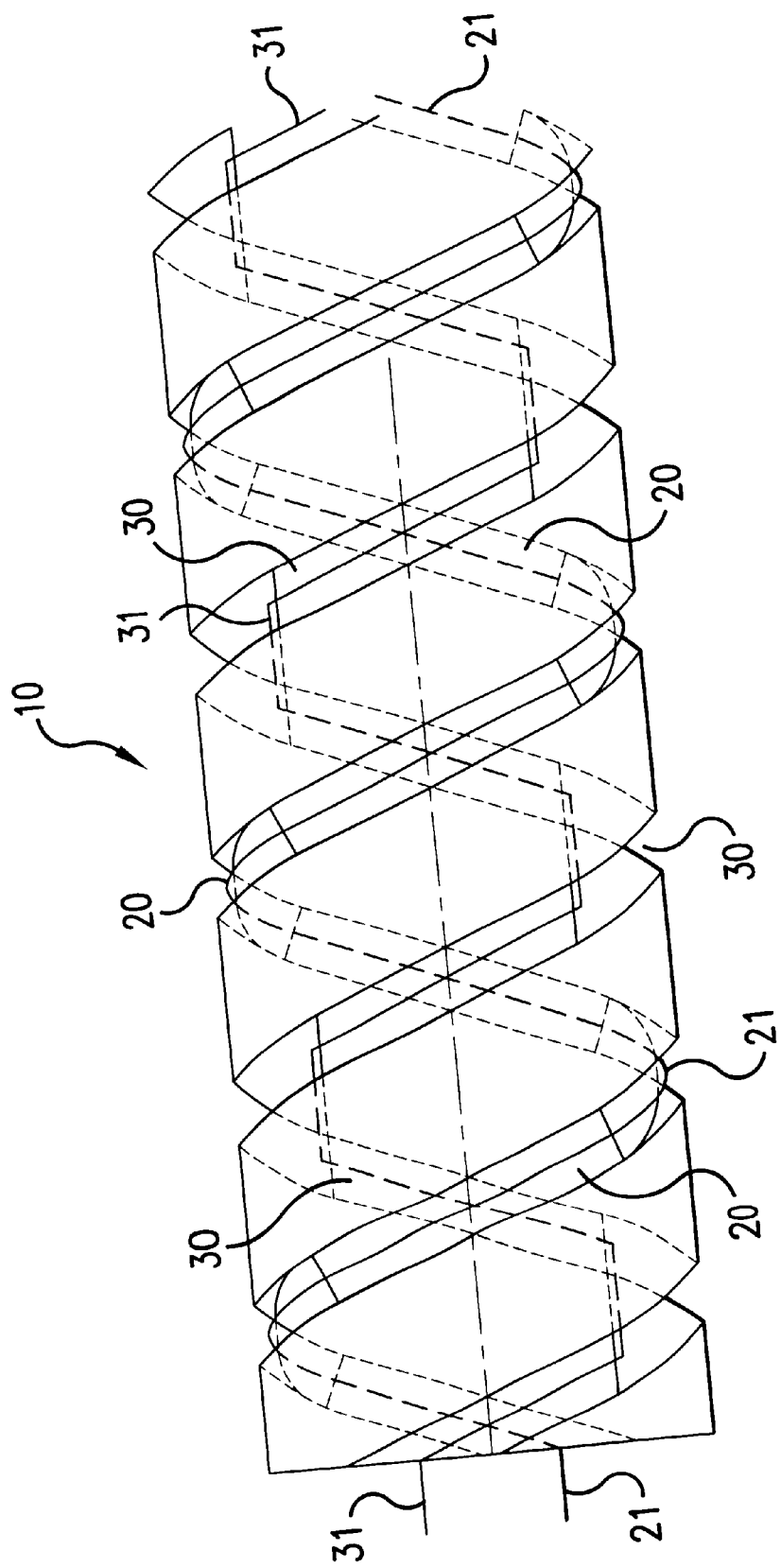
FIG. 1 shows a force sensor according to one preferred embodiment of the invention in a partial view from the side.

FIG. 1 shows a first preferred embodiment of a force sensor as claimed in the invention in a partial view from the side. The force sensor has an elastically deformable carrier 10 which absorbs the force to be measured and on which there are a first and a second strain measurement element 21, 31. The carrier 10 consists preferably of metal, but basically also other elastic materials can be used. The strain measurement elements 21, 31 each consist of one resistance wire of constantan which is preferably provided with an electrically insulating jacket. But also resistance wires of other materials or other strain measurement elements can be used, for example strain gauges. In the cross section of FIG. 2 and in the lengthwise section of FIG. 3 for the sake of clarity only the carrier 10 is shown without the resistance wires 21, 31 which are located on it.

The carrier 10 has essentially the shape of an elongated tube, hereinafter called the measurement tube, with a circular cross section and an inside diameter d2 and an outside diameter d1. The resistance wires 21 and 31 are located in groves 20 and 30 which are made on the outside in the tube wall. The grooves 20, 30 are formed preferably by milling the tube wall and are shaped like a quasi-helical line, in the manner of the two-start threads of a screw, the base lines of the grooves 20, 30, i.e. the lines of the lowest points of the grooves, in the cross sectional projection onto one plane being perpendicular to the tube axis in quasi-rectangular shape, this in contrast to the conventional threads of screws with a circular cross section. In the side view of FIG. 1 the grooves 20, 30 and the resistance wires 21, 31 on the visible side of the force sensor are shown with solid lines and on the hidden side with interrupted lines. The resistance wires 21, 31 are located essentially on the base lines in the grooves 20, 30. The slope of the helical line-shaped grooves is chosen such that the distance in the direction of the tube axis between two adjacent turns of a groove is roughly equal to the outside diameter d1 of the measurement tube 10.

Figure 2:
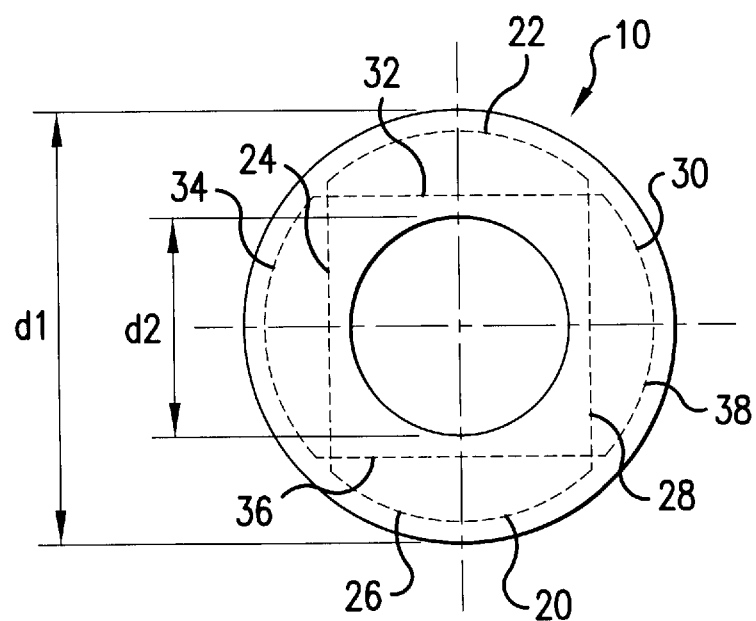
FIG. 2 shows a cross section through the carrier of the force sensor from FIG. 1.

The cross sectional projection of the base line of the groove 20 which is shown in FIG. 2 consists of the two straight vertical lines 24 and 28 and the two arc-shaped essentially horizontal lines 22 and 26 which are arranged in the form of a quasi-rectangle. The vertical extension of the quasi-rectangle 22, 24, 26, 28 is much larger than its horizontal extension because on the one hand the two straight vertical lines 24, 28 extend over a vertical distance which is larger than the horizontal distance over which the two arc-shaped lines 22, 26 extend. On the other hand, in addition the arc-shaped lines 22, 26 are bent to the outside with respect to the quasi-rectangle 22, 24, 26, 28 so that the vertical extension of the quasi-rectangle along its vertical center line is still greater than at its corners. The cross sectional projection of the base line of the groove 20 thus overall has the shape of an upended quasi-rectangle with straight, vertical lengthwise sides 24, 28 and arc-shaped, essentially horizontal narrow sides 22, 26, i.e. a rectangle which stands on the narrow side which is curved in an arc-shape to the outside.

In contrast, the cross sectional projection of the base line of the groove 30 which can be recognized likewise in FIG. 2 has the shape of a quasi-rectangle standing on its lengthwise side with straight horizontal lengthwise sides 32, 36 and arc-shaped essentially vertical narrow sides 34, 38, The horizontal extension of the quasi-rectangle 32, 24, 36, 38 is much greater than its vertical extension because on the one hand the two straight horizontal lines 32, 36 extend over a horizontal distance which is larger than the vertical distance over which the two arc-shaped lines 34, 38 extend. On the other hand, in addition the arc-shaped lines 34, 38 are bent to the outside with respect to the quasi-rectangle 32, 34, 36, 38 so that the horizontal extension of the quasi-rectangle along its horizontal center line is still greater than at its corners.

The measurement tube 10 of the force sensor lies on a solid base (not shown) which essentially prevents any flexion of the measurement tube 10 (in the lengthwise direction of the tube) as a result of the actions of the force. If at this point a force acts on the force sensor essentially vertically from overhead and perpendicular to the lengthwise axis of the tube, the tubular carrier 10 is compressed in the vertical direction and stretched in the horizontal direction transversely to the lengthwise axis of the tube. In this way the resistance wire 21 in the groove 20 which is arranged in the form of a winding with a high cross section around the measurement tube 10 is compressed overall so that its length decreases, conversely the resistance wire 31 in the groove 30 which is located in the form of a winding with a wide cross section around the measurement tube 10 is stretched overall so that its length increases. Thus the two resistance wires 21, 31 change their electrical resistance in opposite directions. Therefore the compression and extension of the measurement tube 10 are measured in one plane perpendicular to the lengthwise direction of the tube. Here it is irrelevant at which points along the tube length the force or forces to be measured act on the measurement tube, rather the measurement signal is always a function of the vertical force components of the external forces to be measured, i.e. the components which are integrated over the entire tube length.

The resistance ratio of the two resistance wires 21, 31 is measured using a Wheatstone bridge circuit and is used as a measure of the sum of the external forces acting essentially vertically on the force sensor. The reaction time of the force sensors as in this embodiment of the invention is short enough that the required time to measure the radial wheel loads of moving vehicles is sufficient in applications of these force sensors in wheel load scales in order to ensure even at driving speeds of 33 m/s (120 km/hr) repeatedly reliability regarding the response rate of the wheel load scales.

The resistance wires 21, 31 are not loosely arranged in the grooves 20, 30, rather the intermediate space between the resistance wires 21, 31 and the edges of the grooves 20, 30 is sealed with a preferably electrically insulating filler material to protect against fouling and/or against displacements of the resistance wires. Epoxy resin has proven effective as a suitable filler for sealing of the resistance wires 21, 31 in the grooves 20, 30.

The measurement tube 10 in its interior with diameter d2 as overload protection has a rod element (not shown) of a solid material. The rod element has an essentially circular cross section with a diameter which is such that the inner surface of the measurement tube 10 strikes at least partially the surface of the rod element when the force sensor is overloaded, before reaching the elastic limit of the measurement tube 10. In this way inelastic deformation of the measurement tube 10 is prevented so that when the forces are measured the measurement tube 10 is deformed only in the linear area below the apparent yielding point (Hooke's line). Preferably in the manufacture of the force sensor first the rod element is inserted into the measurement tube 10, then the force sensor is exposed to a large overload over its entire length and then after load relief zero point setting of the measurement tube is done. Then after the major overload the measurement tube 10 already has a small plastic deformation which is however taken into account in the subsequent zero point setting. During later overloads which do not greatly exceed the amount of the first overload, additional plastic deformation and, thus, also decalibration of the force sensor no longer occur.

To protect against external disruptive influences, the measurement tube 10 together with the resistance wires 21, 31 are located in a hermetically sealable overtube (not shown). If the protective overtube consists of an electrically conductive material, for example, metal, it acts like a Faraday cage. The force sensor is then on the one hand protected against external effects in the form of electromagnetic interference and on the other (as a result of the hermetically sealable overtube) against moisture, dirt, etc. In one embodiment of the invention the overtube consists of the same metallic material as the measurement tube 10. So that the overtube absorbs as much as possible no forces at all which would adulterate the force measurements of the force sensor, the tube wall of the overtube is roughly ten times thinner than that of the measurement tube 10. Moreover the overtube does not have a circular, but an elliptical cross section, the secondary axis of the ellipse being located in the direction of the force to be measured. Preferably to produce the force sensor first an overtube with a circular cross section and an inside diameter which is larger than the outside diameter d1 of the measurement tube 10 is compressed over its entire length until the secondary axis of the now elliptical tube cross section is slightly smaller than the outside diameter d1 of the measurement tube 10. Then the measurement tube 10 is pushed into the overtube such that the secondary axis comes to rest in the direction of the forces to be measured by the force sensor. When the measurement tube 10 is inserted the overtube is slightly widened; in this way reliable and uniform contact between the overtube and the measurement tube is ensured. The stiffness of the overtube with a tube wall which is ten times thinner and with an elliptical cross section comprises less than 1% of the stiffness of the measurement tube, thus largely preventing the adulteration of the force measurement which is caused by the overtube.

Figure 3:
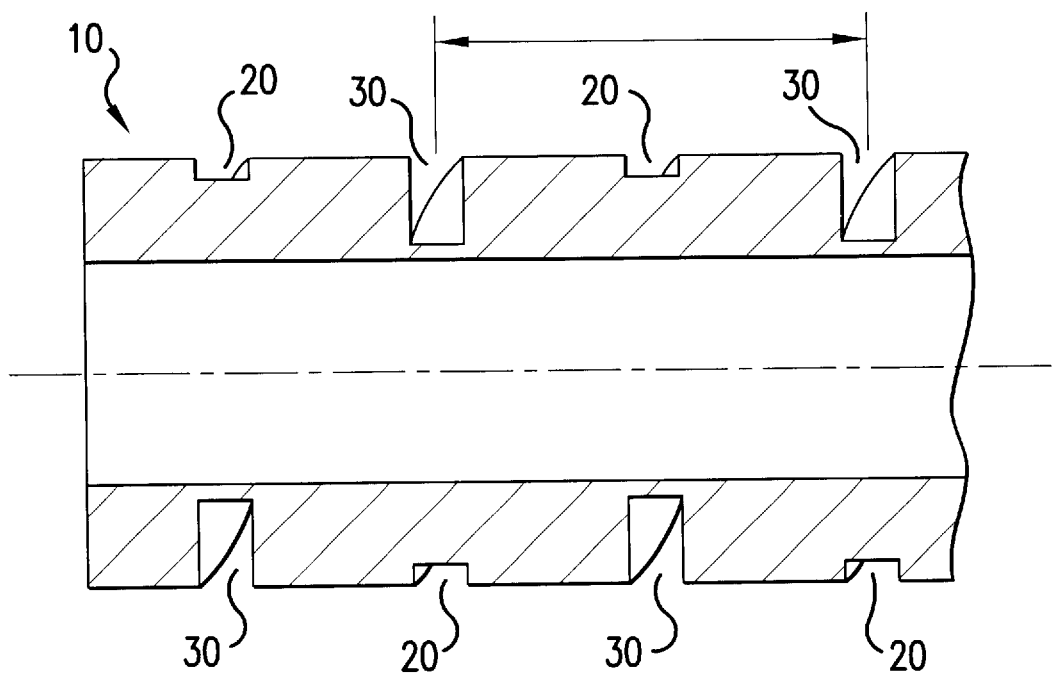
FIG. 3 shows a lengthwise section through one part of the carrier of the force sensor from FIG. 1.

The force sensor as in the embodiment of the invention shown in FIGS. 1 to 3 has the advantage that it is largely immune to disruptive ambient influences. Temperature changes and other external effects such as for example tensile, compressive or shearing forces in the lengthwise direction of the tube, shearing forces transversely to the lengthwise direction of the tube, etc. influence the two strain measurement elements in the same way and do not adversely affect the measurement result to an appreciable degree, since to measure the force only the difference between the measured values of the two strain measurement elements, but not their absolute values, is used. Because it is possible to place the measurement tube 10 together with the resistance wires 21, 31 in a hermetically sealed overtube, the force sensor can be effectively protected against dirt, moisture and other ambient influences, by which good long term behavior of the force sensor can be attained.

Figure 4:
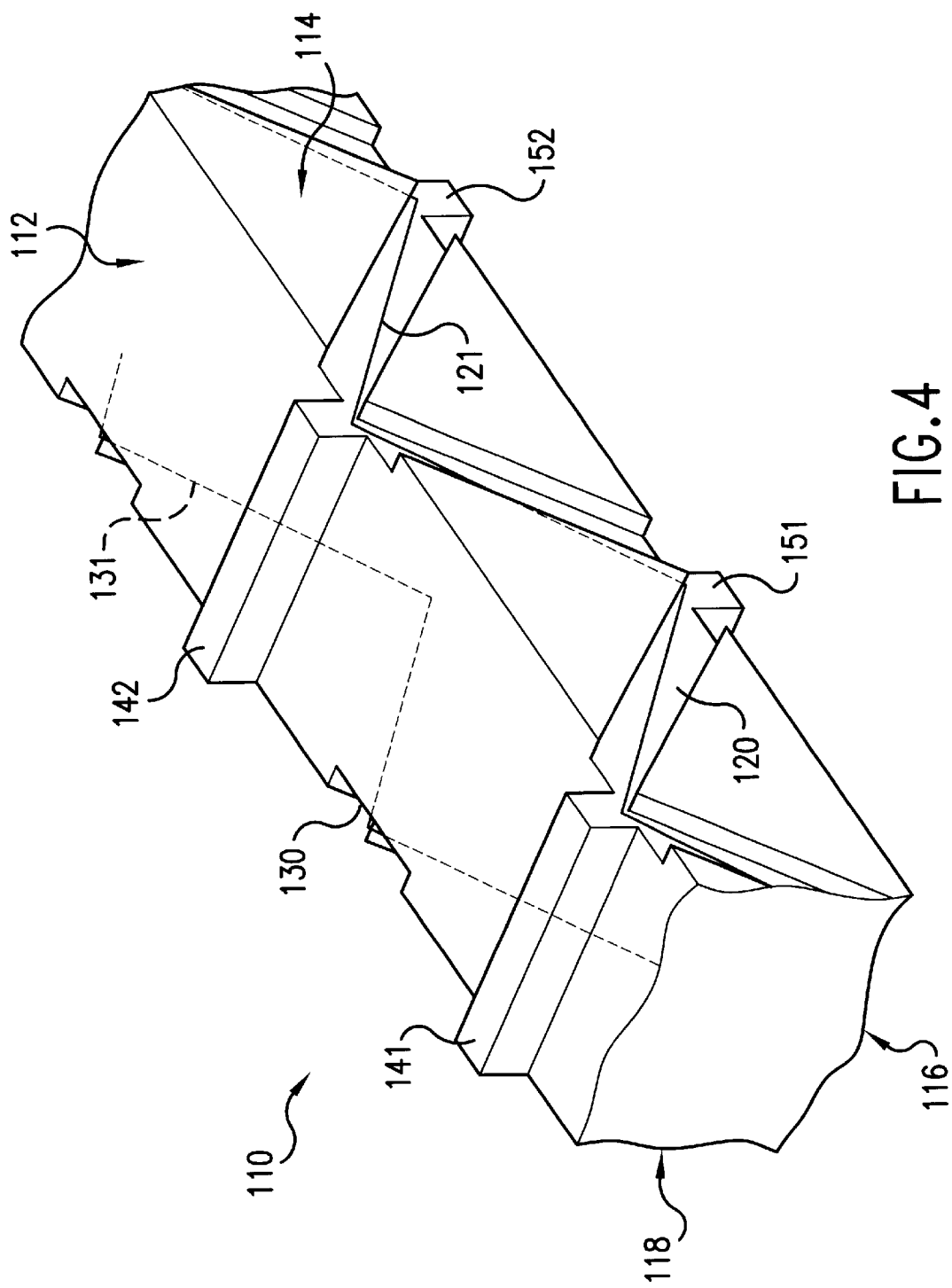
FIG. 4 shows a force sensor according to a second preferred embodiment of the invention in a perspective view.

FIG. 4 shows a force sensor as in a second embodiment of the invention in a perspective partial view. The force sensor has an elastically deformable carrier 110 which absorbs the force and on which there are a first strain measurement element 121 and a second strain measurement element 131. The carrier 10 consists preferably of metal, but basically also other elastic materials can be used. The strain measurement elements 121, 131 each consist of one resistance wire of constantan which is preferably provided with an electrically insulating jacket. But also resistance wires of other materials or other strain measurement elements can be used, for example, strain gauges.

The carrier 110 has essentially the shape of an elongated cuboid with a rectangular cross section and has a top 112, a bottom 116, a right side 114 and a left side 116. The two face sides of the carrier 110 are not shown in the partial view of FIG. 4.

The top 112 of the carrier 110 is provided with first ribs 141, 142 which project to the top and which are arranged at a regular distance and parallel to one another transversely to the lengthwise direction of the carrier. The bottom 116 of the carrier 110 is provided with second ribs 151, 152 which project down and are arranged at a regular interval in turn transversely to the lengthwise direction of the carrier and parallel to the second ribs. The second ribs 151, 152 are offset with reference to the first ribs 141, 142 such that one second rib 151 at a time comes to rest underneath the middle between the two first ribs 141, 142.

The first resistance wire 121 is located in a first groove 120 which is made in the right side 114 of the carrier 110. The first groove 120 runs in a zig-zag between the top 112 and the bottom 116 back and forth, its running from the first rib 141 on the top 112 to the next rib 151 on the bottom 116, from the latter to the next rib 142 on the top 112, from it to the next rib 152 on the bottom 116, etc.

The second resistance wire 131 is located in a second groove 130 which is made on the left side 118 of the carrier 110. The second groove 130 runs in a zig-zag between the top 112 and the bottom 116 back and forth, its running from the middle between the two ribs 141, 142 on the top 112 to the next middle between the two ribs 151, 152 on the bottom 116, from there to the next intermediate rib middle on the top 112, etc. In a projection parallel to the ribs the two grooves 120, 130 thus form two continuously crossing zig-zag lines.

The carrier 110 lies with its two ribs 151, 152 on a solid, unyielding base (not shown). The force to be measured acts essentially vertically from overhead (i.e. perpendicular to the top 112 of the carrier 1110) on the first ribs 141, 142 on the top 112 of the carrier 110. Thus the carrier 110 is deformed in an undulating manner such that the first groove 120 (and thus the first resistance wire 121) are compressed while the second groove 130 (and thus the second resistance wire 131) are stretched. The resistance signals which have been tapped on the two resistance wires 121, 131 are evaluated analogously to the embodiment of the invention shown in FIGS. 1 to 3.

In a similar version of the invention which is shown in FIG. 4 the carrier has the shape of a double-T-carrier with a top chord, a bottom chord and a bridge which connects the top chord to the bottom chord. Similarly to the embodiment shown in FIG. 4, the top chord and the bottom chord are provided with transverse ribs which are offset to one another. The resistance wires run freely suspended in zig-zag lines between the top chord and the bottom chord. Therefore the resistance wires must be pretensioned such that they are always under tensile stress during compression.

A force measurement means or scales as claimed in the invention (not shown) which is especially suitable for measuring the wheel loads of vehicles moving or at rest has several force sensors as claimed in the invention. The tubular force sensors are arranged parallel to one another between an essentially horizontal base plate which forms the base for the force sensors and an essentially vertical cover plate which forms the measurement surface so that the wheel load scales measure the sum of all forces acting perpendicularly on the measurement surface. The resistance wires of the high and wide winding of each force sensor are serially connected to the corresponding winding wires of the other force sensors so that with a single Wheatstone bridge circuit the entire force acting perpendicularly on the measurement surface can be measured.

In one embodiment of the wheel load scales as claimed in the invention, all the measurement tubes of the force sensors are arranged parallel to one another and in the direction of travel of the wheels to be weighed, furthermore the wheel load scales are provided with a coupling device for lateral coupling transversely to the direction of travel to additional connectable wheel load scales. In this way several of these wheel load scales can be coupled to one another in order for example to cover the entire width of the roadway without adulterations of the measurement result and/or dead areas forming at the coupling sites. By means of a row of these wheel load scales arranged over the entire width of the roadway, wheel loads of passing vehicles can be reliably measured regardless of where the vehicles are passing within the width of the roadway.

In summary, it can be stated that the invention makes available a force sensor which is especially suited to measurement of wheel loads of traveling vehicles and which is insensitive to external influences such as temperature changes, vibrations, electromagnetic interference and dirt and which requires a short measurement time to take a measurement, and a force measurement means which is provided with the force sensor.

Reference Number List 10 carrier, measurement tube
20 first groove
21 first strain measurement element or resistance wire
22, 26 arc-shaped, horizontal lines of the first groove in a cross sectional projection
24, 28 straight vertical lines of the first groove in a cross sectional projection
30 second groove
31 second strain measurement element or resistance wire
32, 36 straight vertical lines of the first groove in a cross sectional projection
34, 38 arc-shaped, vertical lines of the second groove in a cross sectional projection
d1 outside diameter of the measurement tube
d2 inside diameter of the measurement tube
110 cuboidal carrier
112 top of carrier
114 right side of carrier
116 bottom of carrier
118 left side of carrier
120 first groove
121 first strain measurement element or resistance wire
130 second groove
131 second strain measurement element or resistance wire
141, 142 first ribs
151, 152 second ribs

What is claimed is:

1. A force sensor for measuring a force applied thereto comprising:
    an elastically deformable carrier elongated in a first direction;
    said deformable carrier being adapted to be supported by a supporting surface with said first direction parallel to the supporting surface;
    said deformable carrier being deformable in response to a force applied to said sensor;
    first and second strain measuring elements associated with said carrier;
    one of said first and second strain measuring elements being compressed in response to a force applied to said elongated carrier in a direction perpendicular to said first direction of elongation and perpendicular to the supporting surface;
    the other of said first and second strain measuring elements being extended in response to a force applied to said elongated carrier in a direction perpendicular to said first direction of elongation and perpendicular to the supporting surface;
    whereby said sensor provides an indication of the magnitude of a force applied to said elongated carrier in a direction perpendicular to said first direction of elongation and perpendicular to the supporting surface based upon changes in said first and second strain measuring elements.

2. The force sensor of claim 1, wherein compression of said one strain measuring element and extension of said other strain measuring element results from elastic deformation of said deformable carrier in response to the force applied to the sensor.

3. The force sensor of claim 2, wherein said deformable carrier is adapted to contact the supporting surface substantially along the entire length of said carrier.

4. A force sensor as claimed in claim 3, wherein the first strain measuring element extends along a first quasi-helical path which is coaxial to the axis of the carrier in said first direction of elongation; and
    the second strain measuring element extends along a second quasi-helical path which is coaxial to the axis of the carrier in the first direction of elongation;
    the shapes of the quasi-helical paths in an axially parallel projection onto a plane normal to said axis each having one relatively long diameter and one relatively short diameter; and
    the long and the short diameter of the first quasi-helical path being sloped at an angle relative to the long and short diameter of the second quasi-helical path.

5. A force sensor as claimed in claim 4, wherein the two quasi-helical paths are arranged in the manner of dual parallel threads.

6. A force sensor as claimed in claim 1, wherein said carrier comprises a tube with a substantially circular cross section.

7. A force sensor as claimed in claim 1, wherein the strain measuring elements comprise an electrical conductor which has electrical resistance which varies with elongation thereof.

8. A force sensor as claimed in claim 3, further comprising an additional member for receiving a force to be measured, said additional member being adapted to transfer said force to said at least one elastically deformable carrier whereby said force sensor provides an indication of the force applied to said additional member.

9. A force sensor as claimed in claim 7, wherein the electrical conductors consist essentially of constantan.

10. A force sensor as claimed in claim 7, further comprising a Wheatstone bridge circuit for measuring the electrical resistance ratio of the electrical conductors as a measure of force.

11. The force sensor of claim 2, wherein said deformable carrier is adapted to contact the supporting surface intermittently along the length of said deformable carrier.

12. The force sensor of claim 1, wherein
    said deformable carrier comprises a top surface and a bottom surface;
    said top surface comprising first ribs spaced along the elongated direction of said carrier;
    said bottom surface comprising second ribs spaced along the elongated direction of said carrier;
    said second ribs being substantially parallel to said first ribs;
    said second ribs being offset with respect to said first ribs in said first direction of elongation;
    whereby said deformable carrier deforms in a substantially undulatory manner in response to a force applied to said elongated carrier in a direction perpendicular to said first direction of elongation and perpendicular to the supporting surface.

13. The force sensor of claim 12, wherein said deformable carrier further comprises first and second sides;

one of said strain measuring elements being associated with said first side and extending along a zig-zag path from points adjacent said first ribs to points adjacent said second ribs; and the other strain measuring element being associated with said second side and extending along a zig-zag path from points adjacent the mid-points between said first ribs to points adjacent the mid-points between said second ribs.

14. A force sensor as in claim 6, wherein said tube is hollow in cross section;

further comprising a rod within said tube for preventing damage to said elongated deformable carrier from excessive deformation thereof.

15. A force sensor as in claim 14, wherein said rod conforms in cross section to the hollow cross section of said tube;

the diameter of said rod being dimensioned such that the inner surface of the tube at least partially engages the surface of the rod element when the force sensor is overloaded before reaching the elastic limit of the tube.

16. A force sensor as in claim 8, comprising at least two elastically deformable carriers each with first and second strain measuring elements, and a device for determining the total force which acts on the at least two elastically deformable carriers.

17. A force sensor as in claim 16, wherein the first and second strain measuring elements comprise electrical conductors with an electrical resistance which varies with elongation thereof, and said device for determining the total force comprises a Wheatstone bridge circuit.

18. A force sensor as in claim 8, further comprising a base comprising the supporting surface.

19. A force sensor as in claim 18, wherein said base is substantially undeformable.

20. A force sensor as claimed in claim 2, wherein one of said strain measuring elements extends along a first path which meanders along the axis of the carrier, the first path running along the surface of a first quarter segment of the carrier; and the other strain measuring element extending along a second path which meanders along the axis of the carrier, the second path running along the surface of a second quarter segment of the carrier;

wherein the second quarter segment adjoins the first quarter segment.

21. A force sensor as claimed in claim 1, wherein the strain measuring elements are arranged in grooves formed in the surface of the carrier.

22. A force sensor as claimed in claim 21, wherein the strain measuring elements are sealed with an electrically insulating material in the grooves.

23. A force sensor as claimed in claim 3, wherein the carrier and the strain measuring elements are located in a hermetically sealable overtube.

24. A force sensor as in claim 8 for measuring the force applied to said additional member by an object travelling across said additional member, wherein at least one elastically deformable carrier is arranged with its first direction of elongation parallel to the direction of travel of the object.

25. A force sensor as claimed in claim 24, further comprising a coupling device for coupling the force sensor to other similar force sensors.

* * * * *